United States Patent
Cerami et al.

(10) Patent No.: US 7,155,205 B2
(45) Date of Patent: Dec. 26, 2006

(54) SYSTEM AND METHOD FOR VERIFYING SUBSCRIBER DATA RECORDS IN A TELEPHONE SYSTEM

(75) Inventors: Robert E. Cerami, Birmingham, AL (US); John D. Ensminger, Homewood, AL (US); Douglas C. Van Natter, Birmingham, AL (US); David C. Isaacson, Columbia, MD (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 465 days.

(21) Appl. No.: 10/094,641

(22) Filed: Mar. 12, 2002

(65) Prior Publication Data

US 2003/0176182 A1    Sep. 18, 2003

(51) Int. Cl.
*H04M 11/00* (2006.01)
(52) U.S. Cl. .............. 455/406; 455/433; 455/408; 455/405; 455/424; 455/414.1; 379/111; 379/114.28; 705/34; 705/40
(58) Field of Classification Search ............... 455/433, 455/406, 408, 424, 414.1, 425; 705/34, 40; 379/111, 114.01, 114.28, 112.01
See application file for complete search history.

(56) References Cited

U.S. PATENT DOCUMENTS

| | | |
|---|---|---|
| 5,146,491 A | 9/1992 | Silver et al. |
| 5,325,290 A | 6/1994 | Cauffman et al. ........... 364/401 |
| 5,333,183 A | 7/1994 | Herbert ....................... 379/112 |
| 5,438,570 A | 8/1995 | Karras et al. ............... 370/94.2 |
| 5,553,131 A | 9/1996 | Minervino, Jr. et al. |
| 5,579,371 A | 11/1996 | Aridas et al. ................. 379/34 |
| 5,659,601 A | 8/1997 | Cheslog |
| 5,675,636 A | 10/1997 | Gray |
| 5,757,895 A | 5/1998 | Aridas et al. ................ 379/136 |
| 5,774,532 A | 6/1998 | Gottlieb et al. ................ 379/11 |
| 5,793,852 A | 8/1998 | Kang et al. |
| 5,809,507 A | 9/1998 | Cavanaugh, III ........... 707/103 |
| 5,915,006 A | 6/1999 | Jagadish et al. |
| 5,920,613 A | 7/1999 | Alcott et al. |
| 5,925,562 A | 7/1999 | Nova et al. .............. 435/287.1 |
| 5,930,343 A | 7/1999 | Vasquez |
| 5,937,343 A * | 8/1999 | Leung ......................... 455/403 |
| 5,940,487 A | 8/1999 | Bunch et al. ................ 379/201 |
| 5,963,625 A | 10/1999 | Kawecki et al. |
| 5,987,107 A | 11/1999 | Brown |

(Continued)

OTHER PUBLICATIONS

U.S. Appl. No. 10/094,614, filed Mar. 12, 2002, entitled "System and Method for Ensuring Proper Billing in a Cellular Telephone System", Inventors: Cerami et al.

(Continued)

*Primary Examiner*—Erika A. Gary
*Assistant Examiner*—Willie J. Daniel, Jr.
(74) *Attorney, Agent, or Firm*—Merchant & Gould

(57) ABSTRACT

A consistency verification tool performs a consistency check on subscriber data records stored in the cellular telephone system. One such consistency check analyzes subscriber data records in a home location register (HLR) and a billing system to determine the presence of duplicate records. Duplicate records can be stored in a duplicate record file for later analysis. During the duplicate record consistency analysis, the consistency verification tool creates a record list. The record list can be a linked list structure for storing main records and duplicate records in a manner that facilitates identifying families of duplicate records. The consistency verification tool can also perform inter-device consistency checks. For example, the subscriber data stored on the HLR can be compared to the subscriber data stored in the billing system to ensure that the two systems have consistent subscriber data.

31 Claims, 7 Drawing Sheets

U.S. PATENT DOCUMENTS

| | | | |
|---|---|---|---|
| 5,987,108 A | 11/1999 | Jagadish et al. | |
| 5,991,376 A | 11/1999 | Hennessy et al. | |
| 5,999,604 A | 12/1999 | Walter | 379/133 |
| 6,016,547 A | 1/2000 | Ono | 713/300 |
| 6,026,291 A * | 2/2000 | Carlsson et al. | 455/406 |
| 6,028,914 A | 2/2000 | Lin et al. | 379/14 |
| 6,038,555 A | 3/2000 | Field et al. | 706/21 |
| 6,052,447 A | 4/2000 | Golden et al. | |
| 6,052,448 A | 4/2000 | Janning | 379/114 |
| 6,052,449 A | 4/2000 | Chavez, Jr. | |
| 6,064,881 A * | 5/2000 | Shea et al. | 455/427 |
| 6,122,352 A | 9/2000 | Kangas et al. | |
| 6,125,173 A | 9/2000 | Jagadish et al. | |
| 6,145,005 A | 11/2000 | Kirkby | |
| 6,223,035 B1 | 4/2001 | Pierce et al. | 455/433 |
| 6,224,477 B1 | 5/2001 | Ho et al. | 455/433 |
| 6,249,570 B1 | 6/2001 | Glowny et al. | 379/88.22 |
| 6,249,572 B1 | 6/2001 | Brockman et al. | 379/133 |
| 6,289,502 B1 | 9/2001 | Garland et al. | 717/2 |
| 6,298,125 B1 | 10/2001 | Goldberg et al. | |
| 6,301,471 B1 | 10/2001 | Dahm et al. | |
| 6,337,901 B1 | 1/2002 | Rome et al. | |
| 6,385,444 B1 | 5/2002 | Peschel et al. | 455/405 |
| 6,411,681 B1 | 6/2002 | Nolting et al. | 379/34 |
| 6,522,734 B1 | 2/2003 | Allen et al. | 379/114.29 |
| 6,539,538 B1 | 3/2003 | Brewster et al. | 717/115 |
| 6,658,099 B1 * | 12/2003 | Perkins, III | 379/112.01 |
| 6,745,384 B1 | 6/2004 | Biggerstaff | 717/156 |
| 6,785,370 B1 | 8/2004 | Glowny et al. | 379/88.22 |
| 6,798,871 B1 | 9/2004 | Richardson | 379/114.04 |
| 6,845,500 B1 | 1/2005 | Ponticelli et al. | 717/107 |
| 2002/0176378 A1 | 11/2002 | Hamilton et al. | 370/328 |
| 2002/0191597 A1 | 12/2002 | Lundstrom | 370/356 |
| 2004/0133487 A1 * | 7/2004 | Hanagan et al. | 705/34 |

OTHER PUBLICATIONS

U.S. Appl. No. 10/094,640, filed Mar. 12, 2002, entitled "System and Method for Managing CDR Information", Inventors: Cerami et al.

U.S. Appl. No. 10/094,642, filed Mar. 12, 2002, entitled "System and Method for Generating Computer Code to Facilitate Development of CDR Management", Inventors: Cerami et al.

Dr. Santosh Chokhani, "Protection of Call Detail Records Data in Federal Telecommunications", IEEE, 1990, pp. 70-77.

N. G. Duffield et al., "A Flexible Model for Resource Management in Virtual Private Networks", ACM, 1999, pp. 95-108.

* cited by examiner

SYSTEM AND METHOD FOR VERIFYING SUBSCRIBER DATA RECORDS IN A TELEPHONE SYSTEM

BACKGROUND

1. Field of the Invention

The present invention relates generally to the field of telephone switching equipment. More specifically, the present invention relates to verifying subscriber information stored in various components of a cellular telephone system to ensure that subscribers are correctly billed for the services they use.

2. Background of the Invention

A critical issue facing cellular telephone companies is ensuring appropriate subscriber billing. For example, it is important to ensure that subscribers are billed for services they use, and not billed for services they do not use. Billing errors result in upset customers, and costly allocation of cellular telephone company resources to locate and fix problems leading to billing errors.

Data regarding particular subscribers and the services that they subscribe to are usually located in several places in a telephone system. A home location register (HLR) stores subscriber data that can be used by a switch in a cellular telephone network to determine the services that a subscriber subscribes to. The HLR is generally located on a service control point (SCP) of the subscriber's provider of record. The HLR contains data that is used to identify and verify subscribers, as well as data indicating what services subscribers can use and data used to provide these services.

The data in the HLR is also used when a subscriber is roaming. A subscriber is roaming when he or she is outside the coverage area of the service provider of record. When roaming, the visited telephone system obtains a copy of the subscriber's data record from the roaming subscriber's HLR and stores it as a temporary record in a visitor location register (VLR). The VLR is maintained during the duration of the subscriber's roaming. It is used by the visited telephone company to provide services in accordance with the services identified by the temporary record stored in the VLR, as well as to provide billing identification information so the visited system can appropriately bill the roaming subscriber.

Cellular telephone networks also contain a billing system that calculates and distributes bills to subscribers for the services they use. Like the HLR, the billing system comprises information regarding each subscriber in the system. The billing data for each subscriber provides information on the services accessible by the subscriber.

The subscriber data located in both the HLR and billing systems includes data regarding the services to which each subscriber has subscribed. The services can be individual services or bundled in service plans. A service plan generally offers a combination of services and service features at a reduced billing rate. Services include local telephone service, long distance telephone service, cellular telephone service, paging service, Internet service and other services. Services for purposes of the present disclosure also include features such as caller ID, call waiting, three-way calling, call return, special ring and other features.

Services are provided to subscribers based on the subscriber data stored in the HLR. Thus, if subscriber data in the HLR indicates a particular subscriber has caller ID, that subscriber is provided caller ID whether the subscriber is billed for it or not. Also, billing is generated based on the subscriber data stored in the billing system. Thus, if the subscriber data in the billing system indicates a particular subscriber has caller ID, that subscriber is billed for caller ID, whether or not the subscriber is actually authorized to use caller ID by the subscriber database.

As a result, it is apparent that significant problems can arise if the subscriber data stored in the HLR and/or the billing system is inconsistent. Such inconsistency can arise if, for example, there are duplicate subscriber records for a particular subscriber that indicate the subscriber subscribes to different and inconsistent services.

In addition, billing problems can occur if the data stored in the HLR differs from the subscriber data stored in the billing system for a particular subscriber. For example, if subscriber data in the HLR indicates that a subscriber can use a particular service, but the subscriber data in the billing system indicates the subscriber does not have access to that service, the subscriber will be able to use the service but will not be billed for that use. Such use represents a lost revenue opportunity for the service provider. In addition, this use by the non-paying subscriber represents a drain on resources that could be used by other subscribers.

Similarly, if subscriber data in the HLR for a particular subscriber indicates that the subscriber does not have access to a particular service, but the billing system subscriber data indicates that the subscriber does have access to the service, the subscriber will be charged for the service even though the subscriber cannot actually use the service. This situation leads to complaints from subscribers who are billed for services they do not use. In addition, expensive telephone company resources are required to track, locate and solve the problem.

A significant problem existing in current cellular telephone systems is that there is no convenient way to compare HLR subscriber data with billing data for consistency. As a result, problems often go undetected unless a customer complains to the telephone company due to the improper billing (which many not happen, for example if the customer is being under-billed).

SUMMARY OF THE INVENTION

The present invention provides a solution to the foregoing problems with conventional cellular telephone systems by providing a consistency verification tool that performs a consistency check on subscriber data records stored in the cellular telephone system. For example, in one embodiment of the present invention, the consistency verification tool analyzes subscriber data records in a home location register (HLR) and in a billing system to determine the presence of duplicate records. Preferably, duplicate records are stored in a duplicate record file for later analysis.

During the duplicate record consistency analysis, the consistency verification tool creates a record list. In one embodiment of the present invention, the record list stores subscriber data records and any duplicate subscriber duplicate records in an array structure that facilitates identifying the duplicate records. In this embodiment, a sorting algorithm can be applied to the array such that after sorting the array, duplicate records appear adjacent to one another. In another embodiment of the present invention, the record list stores main records and duplicate records in a linked-list structure that facilitates identifying families of duplicate records.

The consistency verification tool can also perform inter-device consistency checks. For example, the subscriber data stored on the HLR can be compared to the subscriber data stored in the billing system to ensure that the two systems have consistent subscriber data.

Performing the consistency checks is important to prevent portions of the cellular telephone system from processing subscriber information in different ways. For example, determination of inconsistent billing records between the HLR and the billing system can avoid the cellular telephone company billing for services that are not provided or not billing for services that are provided.

In one embodiment, the present invention is a method for verifying consistency of subscriber data record stored on a device in a cellular telephone network. Such devices include, for example, a billing system and an HLR. The method begins with the step of reading a new record of subscriber data from the device. The new record of subscriber data is compared to each record of subscriber data stored in a record list. In one embodiment, the record list is an array of records. After sorting the array, duplicate records are adjacent to one another in the array.

In another embodiment, the present invention is a system for verifying consistency of subscriber records stored on a device of a cellular telephone system. The system includes a device on which subscriber records are stored. A consistency verification tool coupled to the device reads subscriber records from the device and stores them in memory. Subscriber records are then read from the billing system. Each record is compared to the subscriber data records that are in memory. The consistency verification tool determines whether the new subscriber data record matches a record in the record list, and stores the new subscriber data record in the record list or on disk in accordance with this determination.

In another embodiment, the present invention is a method for verifying subscriber data stored on a source device and target device in a cellular telephone system. The method begins with the step of reading a new subscriber record from the source device. The new subscriber record is compared to each subscriber record in the target device, or until a matching record in the target device is found. The new subscriber record is stored in a non-matching file if the new subscriber record matches no record in the target device. The method continues for each record in the source device until there are no more records in the source device.

In another embodiment, the present invention is a system for verifying subscriber data stored on a source device with subscriber data stored on a target device. The system includes a source device containing a plurality of subscriber data records and a target device containing a plurality of subscriber data records. The subscriber data records on the source device are compared to the subscriber data records on the target device. The system also include a consistency verification tool that reads each subscriber record from the source device and compares it to subscriber data records in the target device until a match is found. If no match is found, the non-matching subscriber data record from the source file is stored in a non-match file.

DETAILED DESCRIPTION OF THE INVENTION

Figure 1:
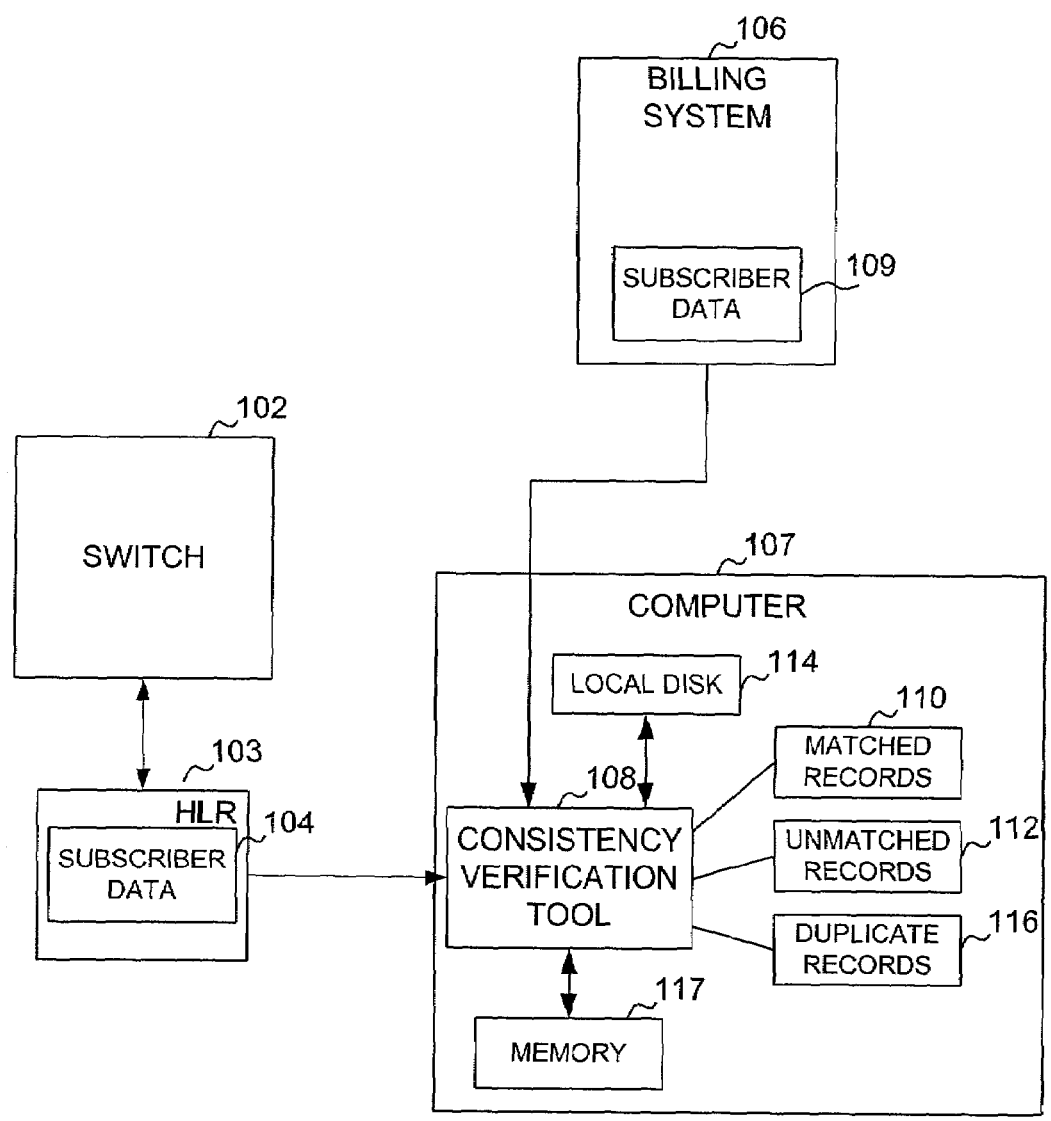
FIG. 1 is a schematic diagram of a system for verifying subscriber data records in a cellular telephone system according to an embodiment of the present invention. The terms "subscriber data record" and "subscriber record" are used herein interchangeably.

FIG. 1 is a schematic diagram illustrating a system for verifying subscriber data records in a cellular telephone system according to an embodiment of the present invention. A switch 102 is coupled to an HLR 103. HLR 103 comprises a disk 104. Disk 104 stores subscriber data. Preferably, disk 104 stores the subscriber data in a plurality of subscriber records. Disk 104 can be any data storage medium including, for example, disk, tape, CD-ROM or any other data storage medium. The subscriber records include data related to services available to each subscriber that is homed on switch 102. Examples of services include local telephone service, long distance service, cellular service, paging service, and Internet service and other services, as well as features such as caller ID, call waiting, three-way calling, call forwarding and other features.

A billing system 106 generates billing for all of or for a portion of the cellular telephone system. Billing system 106 includes a disk 109. Disk 109 stores subscriber data. Preferably, disk 109 stores the subscriber data in a plurality of subscriber records. Disk 109 can be any data storage medium including, for example, disk, tape, CD-ROM or any other data storage medium. Like the subscriber data stored on disk 104 in HLR 103, the subscriber data stored on disk 109 includes data related to the services that a subscriber billed by billing system 106 has access to. Exemplary services are described above.

A computer 107 is coupled to both HLR 103 and billing system 106. Computer 107 executes a consistency verification tool 108. Consistency verification tool 108 can perform a number of verification functions. In one verification function, consistency verification tool 108 analyzes the HLR subscriber data and/or billing subscriber data to determine the presence of duplicate records. Consistency verification tool 108 reports any duplicate records it discovers during its analysis.

There are several reasons why duplicate records might be found in the subscriber data stored in HLR 103 and/or in subscriber data stored in billing system 106. For example, a subscriber may be homed on several HLRs; a subscriber may be assigned multiple phone numbers for a single cellular telephone serial number (which could indicate a nonsensical situation); or a subscriber may have a single telephone number assigned to multiple cellular telephone serial numbers. Consistency verification tool 108 can also store duplicate records in a duplicate record file 116. These records can be analyzed later to determine why there are duplicate records.

Duplicate records need not be identical in their entirety. Rather, duplicate records are those records that have inconsistent information regarding the services subscribed to by a particular subscriber. For example, suppose there are two records for a particular subscriber that indicate the subscriber subscribes to a different set of services. How a particular subscriber is treated in such a case depends on how service provision is implemented in the cellular telephone system. For example, the subscriber may have access to all of the services in the multiple records. Alternatively, the subscriber may have access to the services identified in only one of the multiple records. Alternatively, the subscriber may be given an error condition indicating that the call cannot be completed. In the latter case, the subscriber is not allowed access to the cellular telephone system until the problem is resolved.

A method for performing a duplicate consistency check according to an embodiment of the present invention is now described. The method begins with the step of creating a record list. Creation of the record list can be a declaration of a structure into which record-matching criteria related to records can be stored. In one embodiment of the present invention, the record list structure is an array. In an alternative embodiment of the present invention, described below, the record list structure is a linked list. The record list can be any data structure into which whole or partial subscriber data records can be stored.

The method continues with the step of reading a new subscriber data record from a subscriber data source file. In the present invention, the subscriber data source file is preferably a file comprising subscriber data from HLR 103 or billing system 106. The method continues with the step of comparing the new subscriber data record to record-matching criteria for records in the record list. Records that match are termed duplicate records. If there is no match, a new entry is created in the record list. The method continues by determining if there are more records to check. If there are more records, process repeats. If there are no more records, the process ends.

If a duplicate record is found, the duplicate record is preferably stored as a duplicate in the record list. This can be stored in a separate list or as part of the record list itself as described below. Duplicate records can be stored in file 116.

As described above, the record list according to one embodiment of the present invention is an array structure comprising record list elements. The record list elements correspond to specific records in the subscriber data records. The record list elements can comprise some or all of the record data stored in their corresponding subscriber data records.

Figure 2:
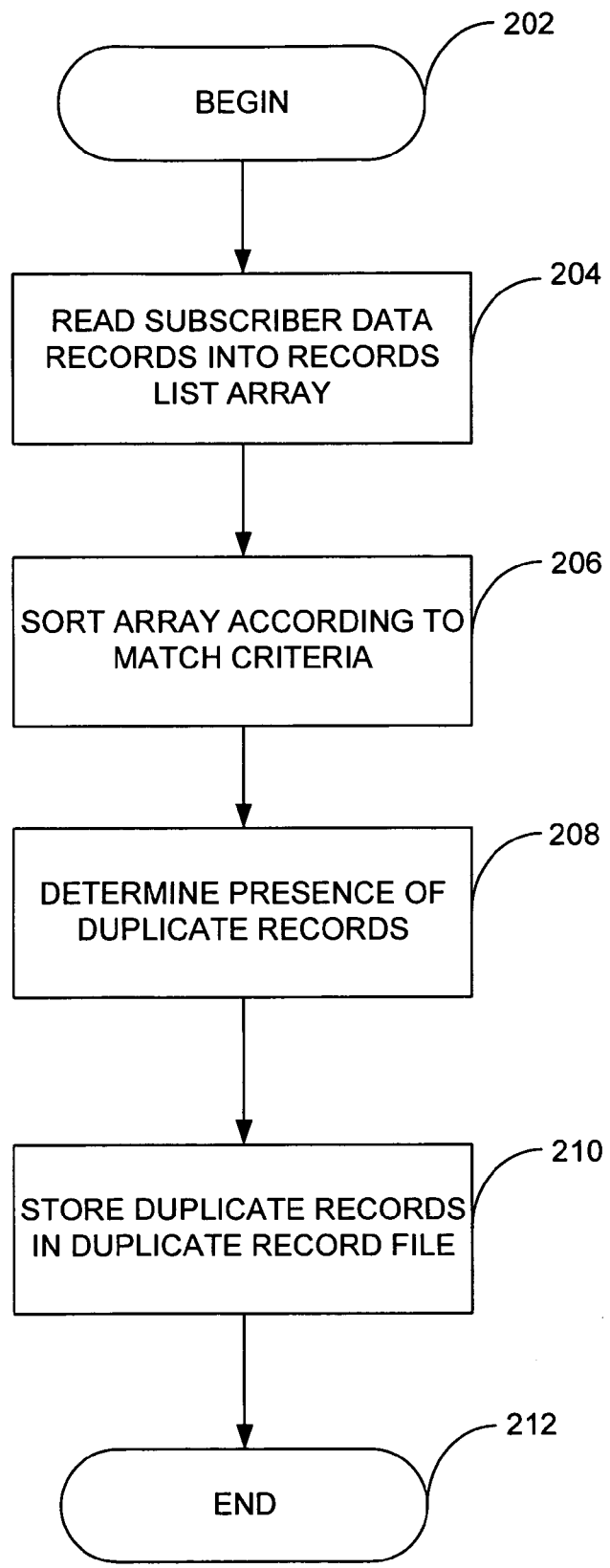
FIG. 2 is a flow chart of a method for performing a duplicate consistency check according to an embodiment of the present invention.

FIG. 2 is a flow chart for a method for performing a duplicate consistency check according to an embodiment of the present invention. The embodiment illustrated in the flow chart of FIG. 2 uses a record list having an array structure. The method begins in step 202. In step 204, the subscriber data records are read into a record list. Preferably, all of the subscriber data records from the HLR or billing system are read into the record list.

Figure 3:
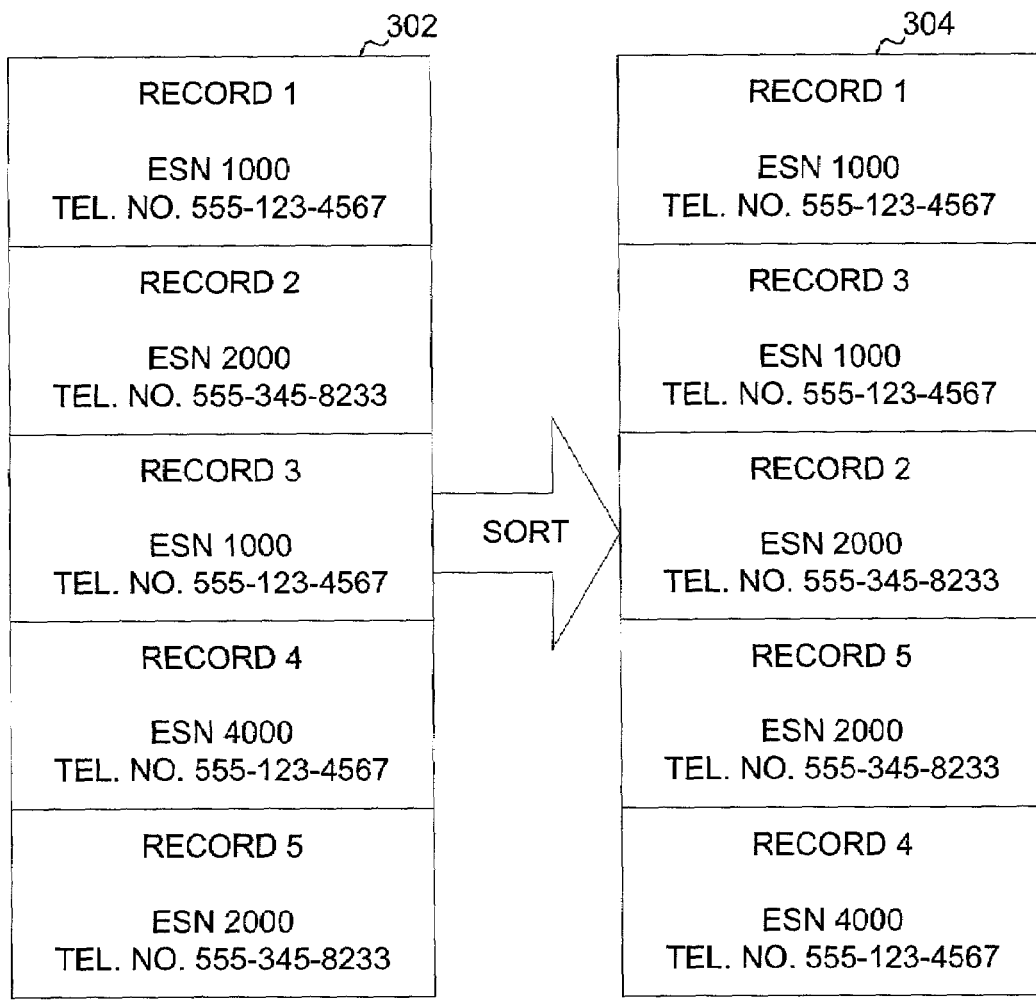
FIG. 3 illustrates reordering of a record list using a sorting algorithm according to an embodiment of the present invention.

For example, FIG. 3 illustrates a record list 302 having an array structure into which five exemplary records are stored. As shown in FIG. 3, record list 302 comprises five records: record 1, record 2, record 3, record 4 and record 5. Record 1 comprises serial number 1 and telephone number 1. Record 2 comprises serial number 2 and telephone number 2. Record number 3 comprises serial number 1 and telephone number 1. Record number 4 comprises serial number 4 and telephone number 1. Finally, record number 5 comprises serial number 2 and telephone number 2. Record 3 is a duplicate of record 1 and record 5 is a duplicate of record 2.

The method continues in step 206 with the step of sorting the record elements in the record list according to one or more match criteria. The match criteria can be any desired data that can be stored in the record elements of the record list. For example, in one embodiment of the present invention, the match criteria are the telephone number and serial number associated with the mobile telephone. The sorting algorithm can be any of a number of well-known sorting algorithms for sorting the data in the record list according to the match criteria. One such sorting algorithm for sorting the record elements in the record list according to the match criteria, for example, is the well-known quick sort algorithm.

In step 208 any duplicate records are identified. The present invention facilitates this identification because, after sorting, any duplicate records appear in consecutive record elements. FIG. 3 also illustrates a record list 304 that results sorting the records in record list 302 according to the match criteria of telephone number and serial number. After sorting, the order of the record elements in record list 304 is record 1, record 3, record 2, record 5 and record 4. As can be seen record 1 and record 3 are duplicates. As such record 1 and record 3 appear in consecutive record elements as a result of sorting. Likewise, record 2 and record 5 are duplicate records. As such, they too appear in consecutive records as a result of sorting.

Returning to the description of the method of FIG. 2, the record data in the record list can be analyzed at this point. For example, the record list can be stored in a file in a viewable format. Preferably however, in step 210, the duplicate records are stored in a duplicate record file that can be later analyzed. The method then ends in step 212.

Figure 4:
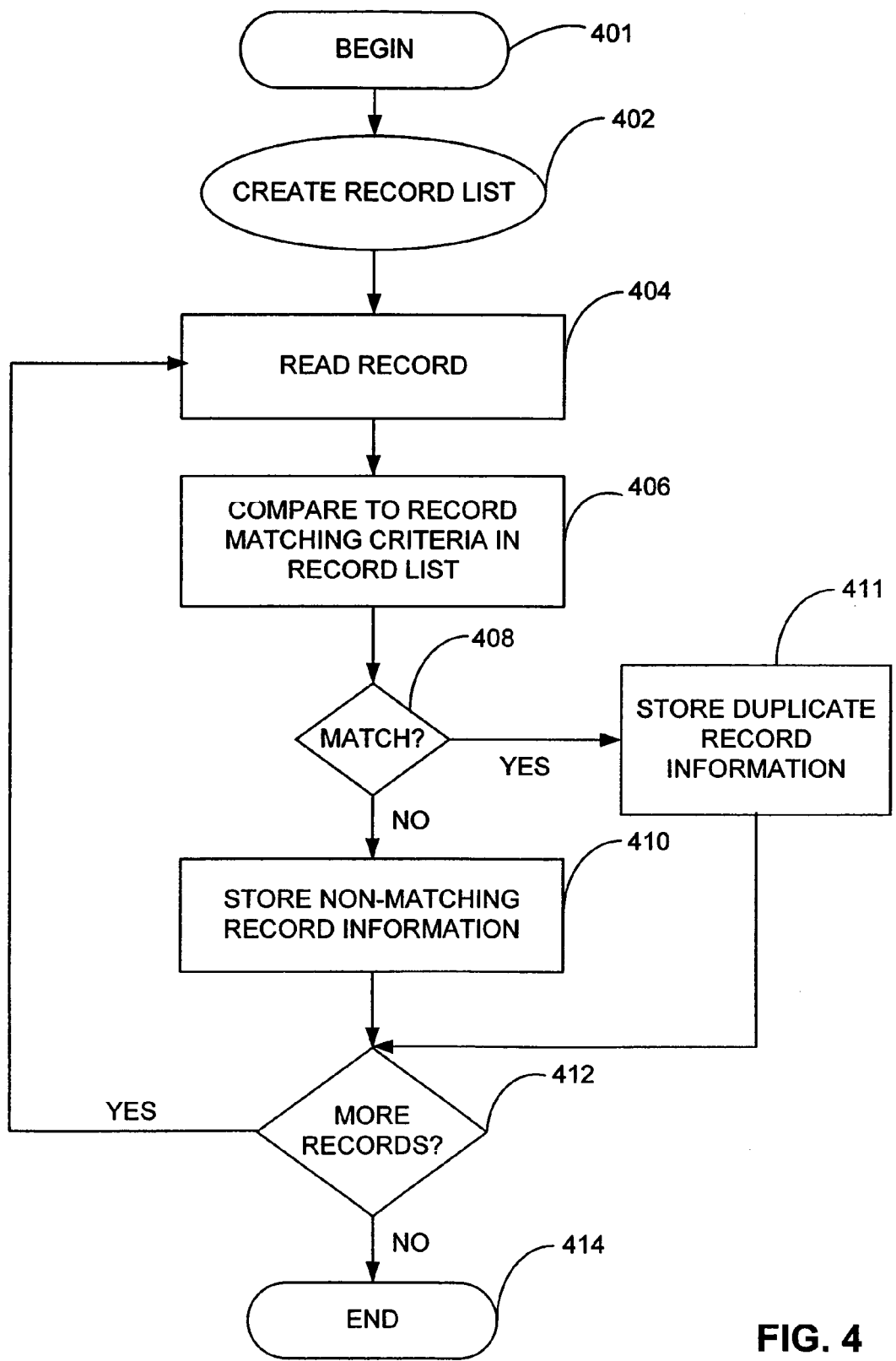
FIG. 4 is a flow chart of a method for performing a duplicate consistency check according to another embodiment of the present invention.

A method for performing a duplicate consistency check according to another embodiment of the present invention is illustrated in the flow chart of FIG. 4. The method illustrated by the flow chart of FIG. 4 can be used for other record list structures in addition to arrays. For example, the method illustrated by the flow chart of FIG. 4 can be used for a record list structure that is a linked list. The method begins in step 401. In step 402, the method continues with the step of creating a record list. Creation of the record list can be a declaration of a structure into which record-matching criteria related to records can be stored. In step 404, the method continues with the step of reading a new subscriber data record from a subscriber data source file. In the present invention, the subscriber data source is preferably a file comprising subscriber data from HLR 103 or billing system 106. In step 406, the method continues with the step of comparing the new subscriber data record to record-matching criteria for records in the record list. As described above, the record matching criteria can be some or all of a subscriber data record. Records that match are termed duplicate records.

If there is no match, the method continues in step 410 with the step of creating a new entry in the record list, and storing information corresponding to the non-matching record in the record list. This information can be the non-matching record itself, the match criteria or some other subset of the non-matching record. If the entire non-matching record is not stored, the information also includes an identification of the non-matching record corresponding to the match criteria.

If a duplicate record is found in step 408, the information corresponding to the duplicate record is stored in step 411. In one embodiment of the present invention, the information corresponding to the duplicate record is stored in a separate duplicate records list in step 411. In an alternative embodiment of the present invention, the information corresponding to the duplicate record is stored in the record list itself in step 411. This information can be the duplicate record itself, the match criteria or some other subset of the duplicate record. If the entire duplicate record is not stored, the information also includes an identification of the duplicate record corresponding to the match criteria. Duplicate records can also be stored in duplicate records file 116 for later analysis.

The method continues in step 412 by determining if there are more records to check. If there are more records, the method continues in step 404. If there are no more records, the method ends in step 414.

Figure 5:
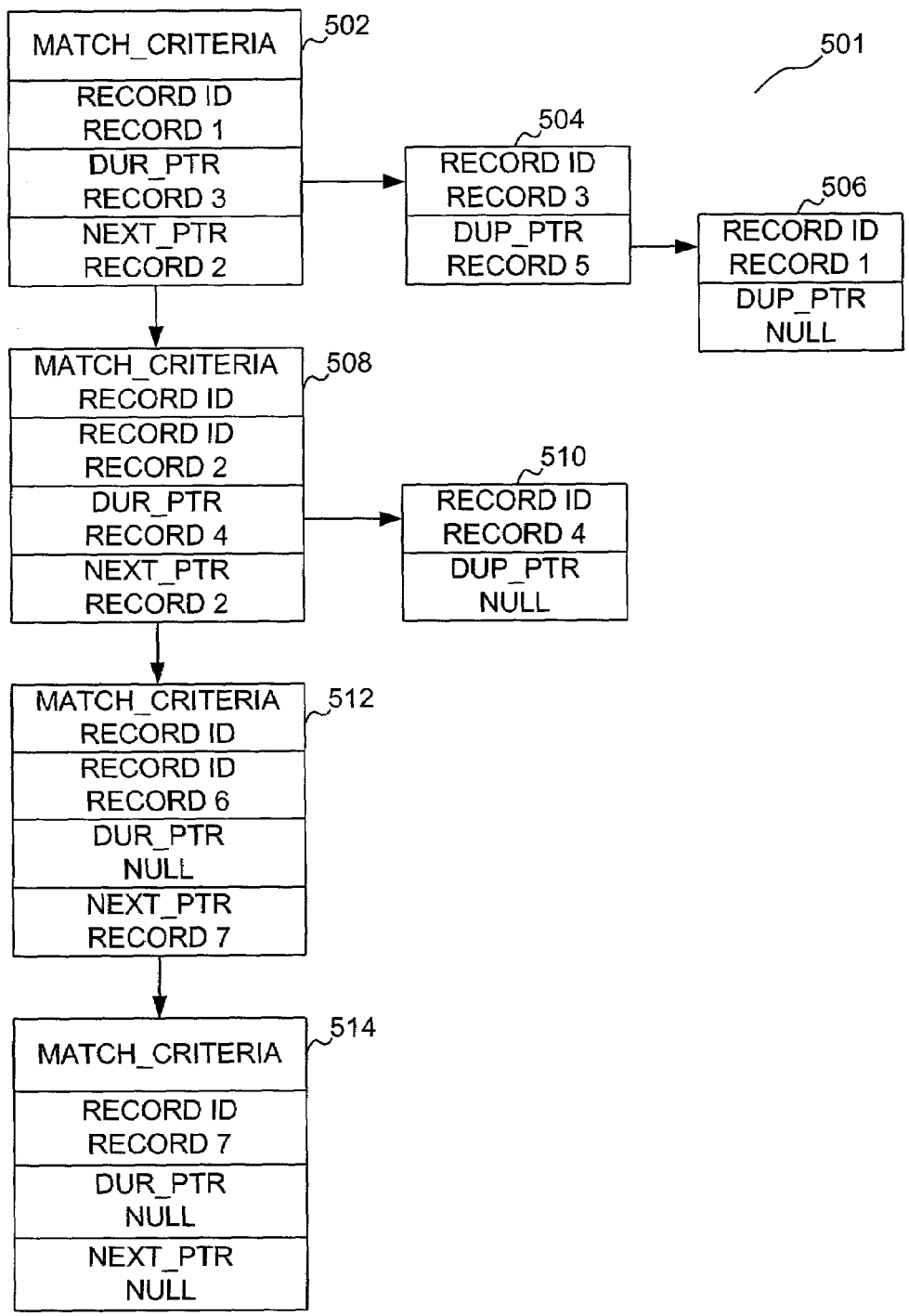
FIG. 5 is an exemplary record list according to an embodiment of the present invention using a linked list.

In an embodiment of the present invention, the record list is a linked list structure as shown, for example, by record list 501 in FIG. 5. Record list 501 has elements 502, 504, 506, 508, 510, 512 and 514. These record list elements represent specific records in the linked list.

Record elements 502, 508, 512 and 514 have a similar structure, and are termed main records. A main record does not match any other main record in record list 501. A record becomes a main record, if when tested, the record does not match any other main record in record list 501.

Figure 5A:
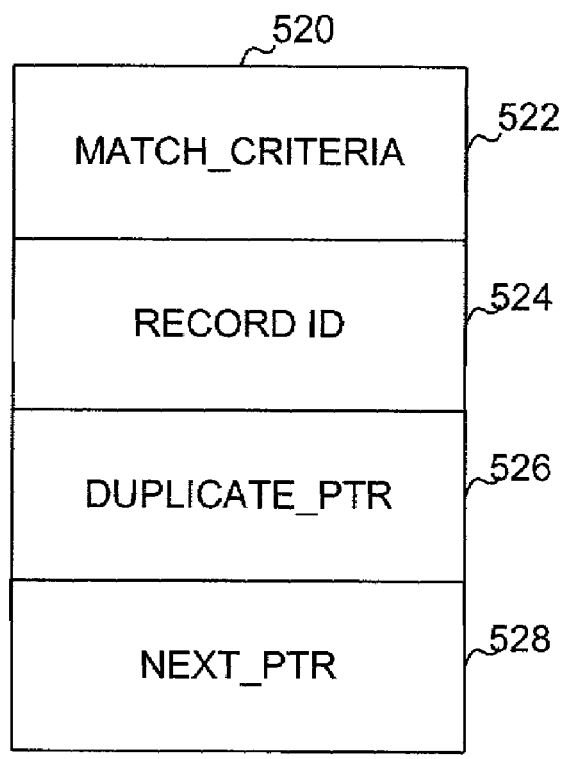
FIG. 5A is an exemplary main record structure for a record list according to an embodiment of the present invention using a linked list.

The structure of a main record according to an embodiment of the present invention is described using exemplary main record 520 shown in FIG. 5A. Main record 520 preferably has four elements. A match criteria structure 522 includes any portion of the data in a subscriber data record. Alternatively, the match criteria structure includes the entire subscriber data record. The match criteria are the criteria used to match records to determine the presence of duplicate records. For example, match criteria can be the subscriber name and telephone number. In this case, if a record is found to have the same subscriber name and telephone number, the record is considered a match, otherwise there is no match.

A record ID 524 identifies the actual subscriber data record in the HLR or billing system that record 520 corresponds to. A duplicate pointer 526 points to the address of the next matching record if one exists. Otherwise duplicate pointer 526 is assigned the value NULL. A NULL value for duplicate pointer 526 indicates that record has no further duplicate records in its chain. A next pointer 528 points to the address of the next main record in record list 501 if one exists. If there are no additional main records, next pointer 528 us assigned the value NULL. A NULL value for next pointer 528 indicates that record is the last main record in the chain of main records in record list 501.

Figure 5B:
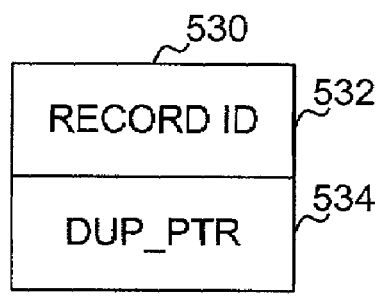
FIG. 5B is an exemplary duplicate record structure for a record list according to an embodiment of the present invention using a linked list.

Record list 501 elements 504, 506 and 510 have the same structure. The records corresponding to elements 504, 506 and 510 matched one of the main records during the consistency check. Such records are called duplicate records. The structure of these duplicate record elements is shown in FIG. 5B by a duplicate record structure 530.

A record ID 532 identifies the actual subscriber data record in the HLR or billing system corresponding to matching record 530. A duplicate pointer 534 points to the address of the next duplicate record if any exists. If there are no more matching records, duplicate pointer 534 points to NULL. A NULL value for duplicate pointer 534 indicates the last record in that family of duplicate records.

It should be noted that any subscriber data record can correspond to a main record or a duplicate record. A main record simply indicates that there was no match for the record at the time the record is compared to records in record list 501.

Consistency verification tool 108 can also be used to compare the subscriber data records in HLR 103 with subscriber data records in billing system 106. In an embodiment of the present invention, matching records are stored in a matched record file 110, and unmatched records are stored in an unmatched records file 112.

Comparing the subscriber data in billing system 106 with subscriber data in HLR 103 can be used to assure that switch 102 provides correct call detail records to billing system 106. For example, if subscriber data for a particular subscriber in HLR 103 indicates that a subscriber is a postpaid customer, whereas the subscriber data in billing system 106 indicates that the subscriber is a prepaid subscriber, all call detail records CDRs related to the subscriber's telephone calls are forwarded by switch 102 to billing system 106. Billing system 106 looks at the CDRs and discards them because it treats the subscriber as a prepaid subscriber. Consequently, billing system 106 does not process the CDRs, because it is programmed to treat prepaid CDRs as if they have already been paid and recorded in a prepaid platform.

To prevent such errors, consistency verification tool 108 compares the subscriber data in billing system 106 to the subscriber data in HLR 103. To perform this compare function, consistency verification tool 108 compares each subscriber record in HLR 103 with each subscriber record in billing system 106, and vice versa.

The comparison is a comparison of subscriber services as they are stored on HLR 103 and billing system 106. In some instances, bundles of services are classified by a single name. In these cases, the individual service for each service that a subscriber subscribes to are unbundled so they can be compared on an individual rather than bundled basis. This ensures that all subscriber data is compared.

Figure 6:
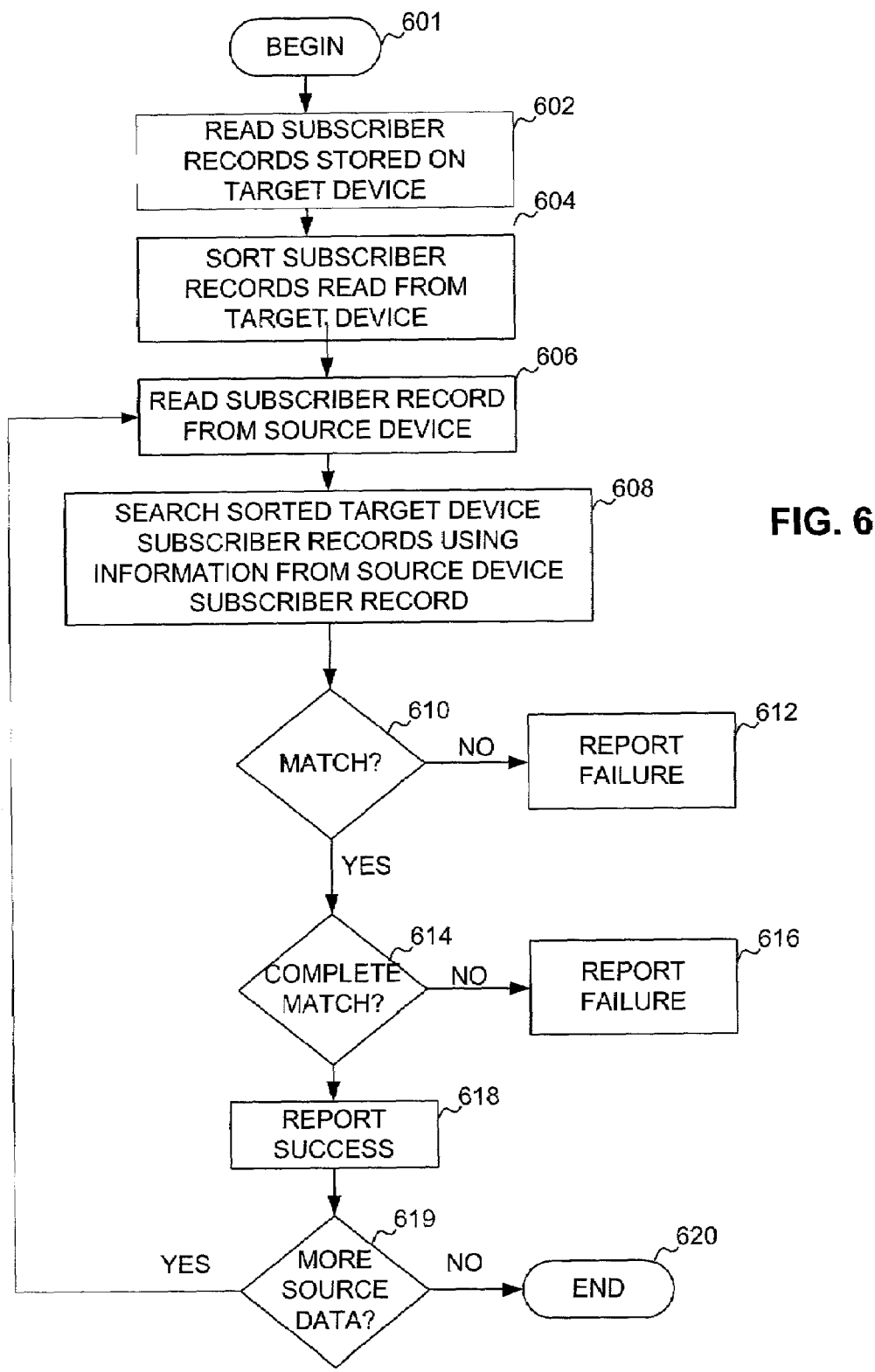
FIG. 6 is a flow chart for a method of comparing subscriber records stored on a source and target device according to an embodiment of the present invention.

In one embodiment, consistency verification tool 108 performs the compare function according to the method shown by the flow chart of FIG. 6. The method begins in step 601. In step 602, consistency verification tool 108 reads the subscriber records from a target device. The target device is the device on which the presence of a subscriber record matching the subscriber record read from the source device is being determined. For example, according to an embodiment of the present invention, the target device is preferably disk 104 or disk 109, whichever is not the source device.

In step 604, the subscriber records read from the target device are sorted. The sorting is performed using predetermined criteria. For example, in an embodiment of the present invention, the subscriber records from the target device are sorted according to the serial number and telephone number stored in the subscriber record. Any sorting algorithm can be used to perform the sorting of step 604. For example, the well-known quick sort algorithm can be used.

Preferably all subscriber records are read from the target device in step 602. Alternatively, a portion of subscriber records from the target device is read into a computer memory 117 or local disk 114. If only a portion of the subscriber records is read, then steps 602 and 604 are repeated with additional portions of memory read in from the target device. The repetition is performed until a matching record is found or all subscriber records stored on the target device have been processed.

In step 606, consistency verification tool 108 reads a subscriber record from a source device. According to an embodiment of the present invention, the source device is either disk 104, which stores subscriber data on HLR 103, or disk 109, which stores subscriber data on billing system 106.

Consistency verification tool 108 can use any of the data in the source device subscriber data record as the basis of the search. For example, in an embodiment of the present invention, the search is performed using the serial number and telephone number associated with the source device subscriber record. Any search algorithm can be used to search the sorted target device subscriber records in step 608. Preferably, the well-known binary search algorithm is used.

In step 610, consistency verification tool 108 determines if there is a record in the target device that matches the source device subscriber data record. If there is no such matching record, then there is an error condition. Consistency verification tool 108 continues the method by reporting the error condition in step 612. In addition, consistency verification tool 108 can store and/or print the non-matching source device.

The error condition depends on the specific search comparison being performed. For example, where HLR 103 is the source device and billing system 106 is the target device, the lack of a matching record in the target device means that there is a record in HLR 103 for which there is no corresponding record in billing system 106. As a result, a customer would have access to service, but billing system 106 would not know how to bill them. This situation could result in the customer receiving service free of charge and lost revenues to the cellular telephone company. Similarly, where billing system 106 is the source device and HLR 103 is the target device, the lack of a matching record in the target device means that there is a record in billing system 106 for which there is no corresponding record in billing system 103. As a result, a customer would be billed for service that the customer does not receive.

If consistency verification tool 108 detects a matching record in step 610, it continues in step 614 by determining if the source device subscriber record fully matches the matching record in the target device. If the match is not complete there is a potential error condition, which consistency verification tool 108 reports in step 616. In addition, consistency verification tool 108 can store and/or print the source device and partially matching target device subscriber records.

The consequence of partially matching records depends on the kind of error. For example, one error condition involves incorrectly classifying a customer. The customer may be classified as being a pre-paid customer, when the customer is actually a post-paid customer or vice verse. As described above, this condition often leads to improper billing and/or lost revenues. Another possibility is that a customer may be listed as active by the source device record but inactive or suspended by the target device record. Again, this condition likely leads to improper billing and/or lost revenues. Another possible consequence of partial matching records is that the customer may be getting services he or she is not paying for or paying for services he or she is not getting. Other potential error conditions would be known to those skilled in the art.

If there is a complete match determined in step 614, consistency verification tool 108 continues the method in step 618 by reporting that the source device subscriber record successfully matched a target device subscriber data record.

Consistency verification tool 108 continues the method in step 619 with the step of determining whether there is are more source device subscriber records to process. If there are more source device subscriber records to process, the method continues in step 606 with the step of reading the next source device subscriber record. Thus, the method of FIG. 6 can be executed to compare one or more source device subscriber records with the target device subscriber records. If consistency verification tool 108 determines that there are no more source device subscriber records to process in step 619, the method ends in step 620.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for verifying consistency of subscriber records stored on a device in a cellular telephone network, comprising:
reading the subscriber data records into a record list comprising a plurality of record elements stored in a computer memory;
sorting the subscriber data records stored in the record list such that duplicate subscriber records are stored in consecutive record elements in the record list; and
identifying duplicate records in the record list wherein at least one of the duplicate records exists in the record list due to at least one of the following: a subscriber being homed on more than one home location registers (HLRs), the subscriber being assigned multiple telephone numbers for a single cellular telephone serial number, and the subscriber having a single telephone number assigned to multiple cellular telephone serial numbers wherein the duplicate records correspond to at least one of the following: the subscriber being improperly billed and the subscriber receiving services inconsistent to what services were being billed to the subscriber.

2. The method recited in claim 1, further comprising storing identified duplicate records in a duplicate record file.

3. The method recited in claim 1, further comprising sorting the subscriber data records according to one or more matching criteria.

4. The method recited in claim 3, wherein the matching criteria include a telephone number of a cellular telephone.

5. The method recited in claim 3, wherein the matching criteria include a serial number of a cellular telephone.

6. The method recited in claim 1, further comprising formatting the record list as a computer array data structure.

7. A system for verifying consistency of subscriber records stored on a device of a cellular telephone system, comprising:
   a device on which the subscriber records are stored, wherein the subscriber records comprise data related to services available to each subscriber;
   a consistency verification tool coupled to the device to read a new subscriber record from the device;
   a computer memory coupled to the consistency verification tool; and
   a record list stored in the memory, the record list formatted as a computer array comprising a plurality of records that the consistency verification tool compares to the new subscriber record,
   wherein the consistency verification tool determines whether the new subscriber record matches a record in the record list and stores the new subscriber record in accordance with the determination made by the consistency verification tool, wherein the new subscriber record is stored when the verification tool determines that the new subscriber record contains inconsistent information regarding services subscribed to by a subscriber wherein the inconsistent information corresponds to at least one of the following: the subscriber being improperly billed and the subscriber receiving services inconsistent to what services were being billed to the subscriber.

8. The system recited in claim 7, further comprising a home location register, wherein the device is a disk in the home location register.

9. The system recited in claim 7, further comprising a billing system, wherein the device is a disk in the billing system.

10. A method for verifying consistency of a subscriber records stored on a device in a cellular telephone network, comprising:
   reading a new record of subscriber subscription data from the device;
   comparing the new record of subscriber subscription data to each record of subscriber subscription data stored in a record list;
   if no match is found, storing the new record of subscriber subscription data in the record list as a main record and reporting an error indicating that a customer is incorrectly classified in a classification that corresponds to at least one of the following: the customer being improperly billed and the customer receiving services inconsistent to what services were being billed to the customer; and
   if a match is found, storing the new record of subscriber subscription data in the record as a duplicate record.

11. The method recited in claim 10, further comprising:
   identifying matching criteria using a portion of a data in a subscriber subscription data record; and
   wherein comparing the new record of subscriber subscription data to each record of subscriber subscription data stored in the record list is performed in accordance with the matching criteria.

12. The method recited in claim 10, further comprising:
   defining the record list to be a linked list; and
   storing the new record in accordance with the defined link list.

13. The method recited in claim 12, further comprising:
   assigning a NULL value to a next pointer to a next main record when the next pointer comprises a last main record in a chain of main records; and
   assigning a NULL value to a duplicate pointer to a duplicate record when the duplicate pointer comprises a last matching record in a family of duplicate records.

14. The method recited in claim 12, further comprising:
   defining the main record to comprise a matching criteria field, a record identification field, a duplicate pointer field and a next pointer field; and
   defining the matching record to comprise a record identification field and a duplicate record field.

15. A system for verifying consistency of a subscriber records stored on a device of a cellular telephone system, comprising:
   a device on which the subscriber records are stored;
   a consistency verification tool coupled to the device to read a new subscriber record from the device;
   a computer memory coupled to the consistency verification tool; and
   a linked list stored in the memory, the linked list comprising a plurality of records that the consistency verification tool compares to the new subscriber record,
   wherein the consistency verification tool determines whether the new subscriber record matches a record in the linked list and stores the new subscriber record with a main record structure if the consistency verification tool determines that the new subscriber record does not match a record in the linked list and with a duplicate record structure linked to a main record if the consistency verification tool determines that the new subscriber record does match a record in the linked list, wherein the stored new subscriber record contains inconsistent information regarding services subscribed to by a subscriber wherein the inconsistent information corresponds to at least one of the following: the subscriber being improperly billed and the subscriber receiving services inconsistent to what services were being billed to the subscriber.

16. The system recited in claim 15, further comprising a home location register, wherein the device is a disk in the home location register.

17. The system recited in claim 15, further comprising a billing system, wherein the device is a disk in the billing system.

18. The system recited in claim 15, wherein the main record structure comprises a matching criteria field, a record identification field, a duplicate pointer field and a next record field, and wherein the duplicate record structure includes a record identification field and a duplicate pointer field.

19. A method for verifying subscriber data stored on a source device with subscriber data stored on a target device in a cellular telephone system, comprising:
   reading a first new subscriber record from the source device;
   comparing the first new subscriber record to each subscriber record in the target device;
   storing the first new subscriber record in a non-matching file and reporting an error condition if the first new subscriber record does not match a record in the target device, the reported error condition indicating that a customer is incorrectly classified in a classification that corresponds to at least one of the following: the customer being improperly billed and the customer receiving services inconsistent to what services were being billed to the customer;

determining if there are more records in the source device;

reading a second new subscriber record from the source device if there are more records in the source device; and stopping if there are no more records.

20. The method recited in claim 19, further comprising the step of storing the new subscriber record in a match file if the new subscriber record matches a record in the target device.

21. The method recited in claim 19, wherein the source device is a disk in the home location register and the target device is a disk in the billing system.

22. The method recited in claim 19, wherein the source device is a disk in the billing system and the target device is a disk in the home location register.

23. A system for verifying subscriber data stored on a source device with subscriber data stored on a target device, comprising:

a source device that has a plurality of subscriber records;

a target device that has a plurality of records to which each record in the source device can be compared;

a consistency verification tool to read each record in the source device, wherein the consistency verification tool compares each read record to each record in the target device until a record is found in the target device that matches the record in the source device, or until the consistency verification tool determines that there is no such matching record, wherein the consistency verification tool reports an error condition, the reported error condition indicating that a customer is incorrectly classified in a classification that corresponds to at least one of the following: the customer being improperly billed and the customer receiving services inconsistent to what services were being billed to the customer; and a non-match file into which the consistency verification tool stores each record from the source device that does not match a record in the target device.

24. The system recited in claim 23, wherein the source device is a disk in the billing system and the target device is a disk in the home location register.

25. The system recited in claim 23, wherein the source device is a disk in the home location register and the target device is a disk in the billing system.

26. The system recited in claim 23, further comprising a match file into which subscriber data records from the source device that match a record in the target device are stored.

27. A system for verifying subscriber data stored on a source device with subscriber data stored on a target device in a cellular telephone system, comprising:

means for reading a first new subscriber record from the source device;

means for comparing the first new subscriber record to each subscriber record in the target device;

means for storing the first new subscriber record in a non-matching file and reporting an error condition if the first new subscriber record does not match a record in the target device, the reported error condition indicating that a customer is incorrectly classified in a classification that corresponds to at least one of the following: the customer being improperly billed and the customer receiving services inconsistent to what services were being billed to the customer;

means for determining if there are more records in the source device;

means for reading a second new subscriber record from the source device if there are more records in the source device; and means for stopping if there are no more records.

28. The system recited in claim 27, further comprising means for storing the new subscriber record in a match file if the new subscriber record matches a record in the target device.

29. The system recited in claim 27, wherein the source device is a disk in the home location register and the target device is a disk in the billing system.

30. The system recited in claim 27, wherein the source device is a disk in the billing system and the target device is a disk in the home location register.

31. A method for verifying consistency of a subscriber records stored on a device in a cellular telephone network, comprising:

reading a new record of subscriber subscription data from the device;

comparing the new record of subscriber subscription data to each record of subscriber subscription data stored in a record list;

if no match is found, storing the new record of subscriber subscription data in the record list as a main record and reporting an error indicating that a customer is incorrectly classified; and if a match is found, storing the new record of subscriber subscription data in the record as a duplicate record wherein the customer is incorrectly classified as being one of the following: the customer being classified as being a pre-paid customer when the customer is actually a post-paid customer and the customer being classified as being a post-paid customer when the customer is actually a pre-paid customer.

* * * * *